United States Patent [19]

Healy

[11] 4,322,861
[45] Apr. 6, 1982

[54] ENTRANCE FOR A BEEHIVE

[76] Inventor: Kenneth T. Healy, P.O. Box 131, Cannington, Western Australia, Australia, 6107

[21] Appl. No.: 224,683

[22] Filed: Jan. 13, 1981

Related U.S. Application Data

[63] Continuation of Ser. No. 28,644, Apr. 10, 1979, abandoned.

[30] Foreign Application Priority Data

Apr. 14, 1978 [AU] Australia .................. PD4036

[51] Int. Cl.³ .............................................. A01K 47/06
[52] U.S. Cl. ....................................................... 6/4 R
[58] Field of Search ................... 6/4 R, 4 A, 12 M

[56] References Cited

U.S. PATENT DOCUMENTS 3,343,186  9/1967  Dunand ............................ 6/4 R
3,995,338 12/1976  Kauffeld .......................... 6/4 R
4,007,504  2/1977  West ................................ 6/4 R

FOREIGN PATENT DOCUMENTS 1259411  3/1961  France ............................ 6/4 R
 609257  9/1960  Italy .............................. 6/4 R Primary Examiner—Hugh R. Chamblee
Attorney, Agent, or Firm—Harness, Dickey & Pierce

[57] ABSTRACT

A pollen collecting entrance structure for a beehive comprising a base for supporting a beehive, said base defining an accessway providing communication with the exterior of the base and the space, said space being in open communication with the beehive, a grid removably mounted across the path through the space between the accessway and the beehive, a removable receptacle located below the grid to collect the pollen dislodged from the bees bodies when passing through the grid, said grid and receptacle being removable from the base without the need to disturb the beehive.

22 Claims, 3 Drawing Figures

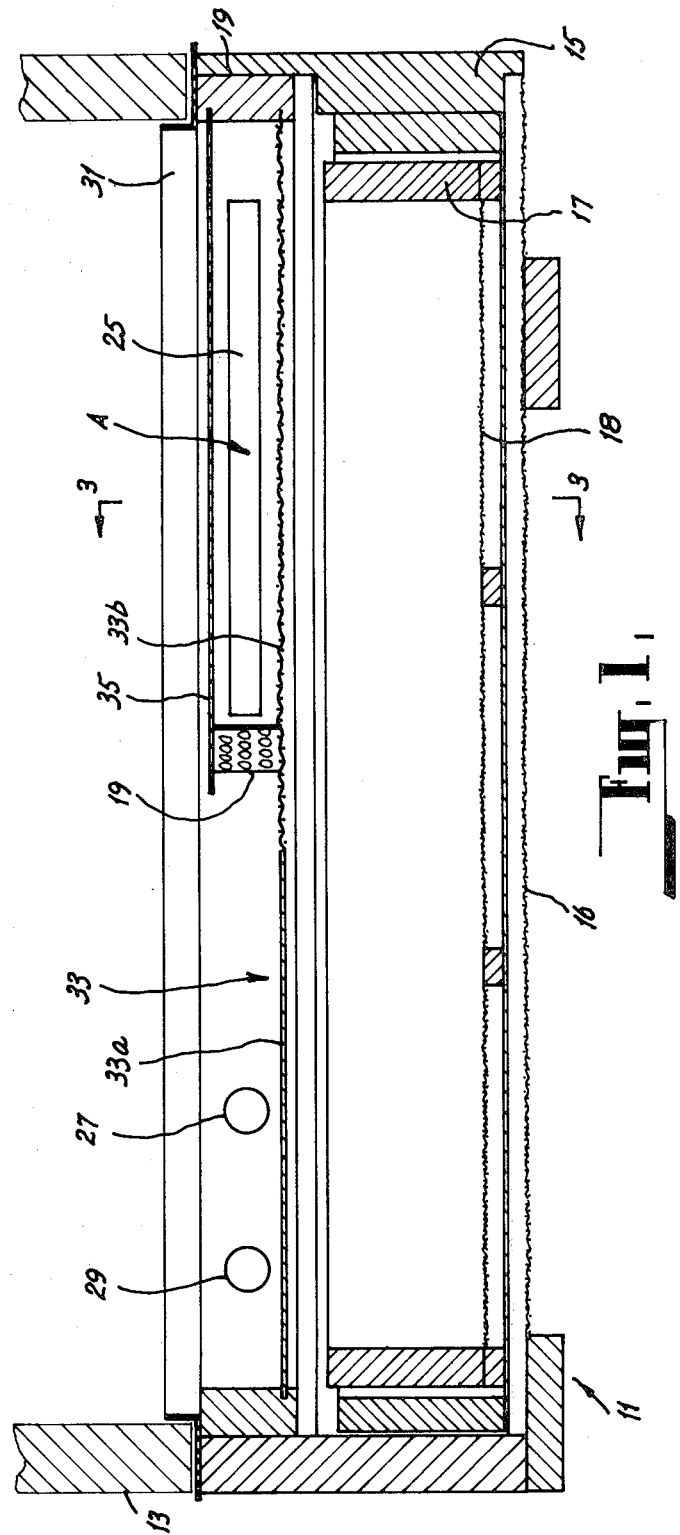

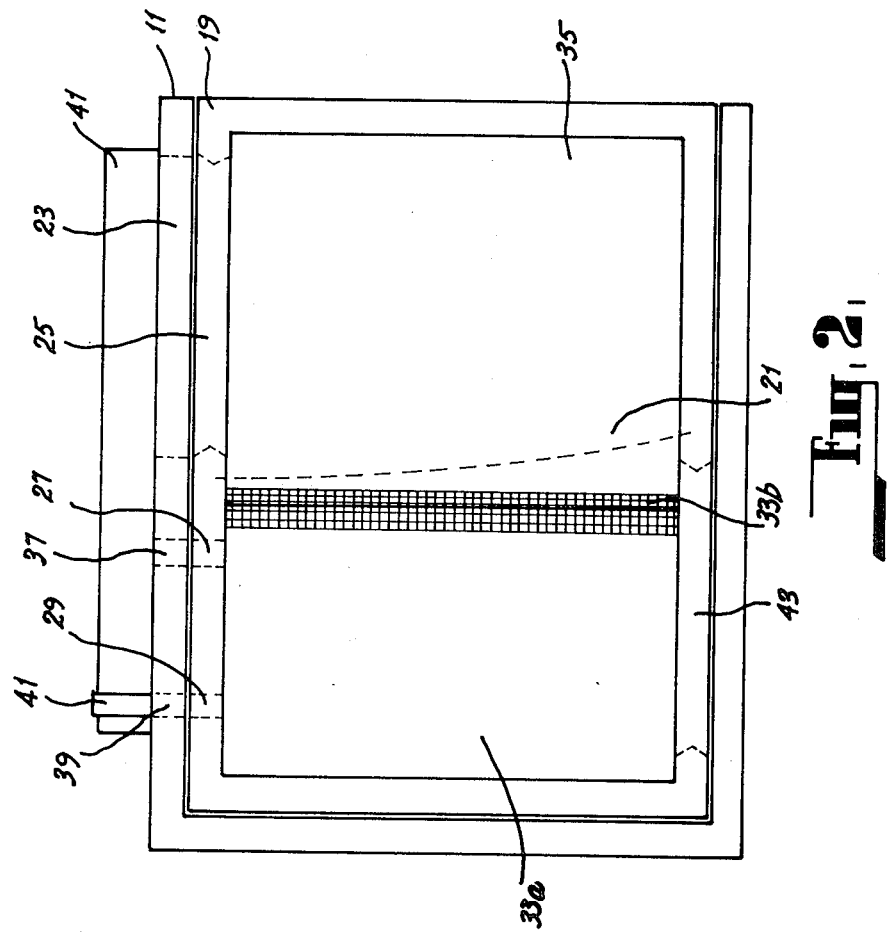

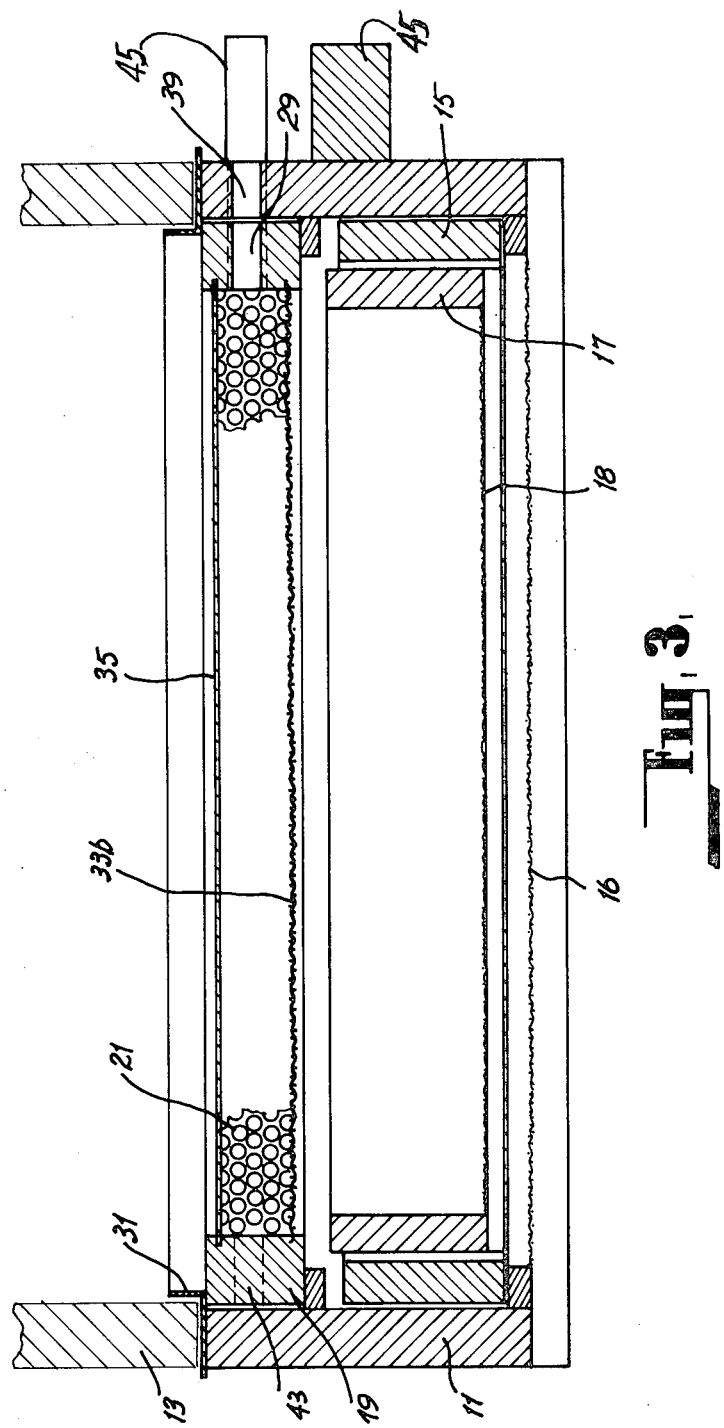

ENTRANCE FOR A BEEHIVE

This is a continuation of application Ser. No. 28,644, filed Apr. 10, 1979 now abandoned.

This invention resides in an entrance structure for beehives, to facilitate the collection of pollen.

It is an object of this invention to provide an entrance structure for a beehive which facilitates the collection of pollen wherein the means of collecting the pollen can be removed without disturbance of the hive.

In one form the invention resides in an entrance structure for a beehive comprising a base for supporting the beehive, said base defining a space having an entrance and an exit opening at spaced locations around the side of the base and which is open at the top for communication between the space and the hive body, a grid removably mounted in the base and positioned across the space between the path from the entrance to the interior of the hive body, a receptacle removably mounted within the base below the grid, said grid and receptacle being removable from the base without absorbing the base in its supporting relationship with the beehive.

The invention will be more fully understood in the light of the following description of one specific embodiment. The description is made with reference to the accompanying drawings of which:

FIG. 1 is a sectional side elevation of the entrance structure of the embodiment;

FIG. 2 is a plan view of the entrance structure of FIG. 1; and

FIG. 3 is a sectional end elevation along line 3—3 of FIG. 1.

The embodiment comprises a base 11 to be mounted underneath a beehive body 13. The sealing of the beehive body 13 on the base 11 is facilitated via a weather sealing frame 31 formed of angle material and extending around the top of the base where one web extends outwardly beyond the sides of the base to water running down the walls of the base and entering into the base to ruin the pollen contained therein. In addition, the other web of the angle material extends upwardly to engage the interior side faces of the beehive body and locate it in position. The base 11 is box shaped and is of corresponding dimensions to the underneath of the hive body 13. The top of the base is open such that there is free communication between the interior of the hive body and the base, while the bottom of the base is closed by mesh 16 to prevent entry of the bees into the lower portion thereof. One end of the base is open and this is closed by a drawer 15 which is slidably mounted in the base. The drawer supports a liner 17 the bottom 18 of which is perforate and is suspended above the floor of the drawer. The base 11 also slidably supports a frame 19 which extends across the base. The frame 19 is removable from the base after the removal of the drawer and is capable of transposition through 180° in a horizontal plane, end for end in the base.

The frame 19 supports a floor 33 extending across the area of the frame and divided transversely into two portions, one of which 33a is imperforate while the other 33b is in the form of a perforate metal mesh. An imperforate sheet 35 is located parallel to and spaced above the floor 33 such that it covers the perforate portion of the floor 33b. The space A defined between the second sheet 35, the perforate metal mesh 33b and the walls of the frame 19 is closed by a perforate metal screen 21 mounted and transversely across the frame 19.

It is preferable that the screen 21 be bowed as shown in FIG. 2 in order that the bees will be directed to the central portion of the screen 21 and not to one end thereof and thus will deposit the pollen in the centre of the drawer. One side wall of the frame in the enclosed region A is provided with an elongate slot 25 providing access into the closed region from outside the frame 19. The side wall is also provided with a pair of holes 27 and 29 providing access through the side wall into the region above the imperforate portion of the floor 33. The elongate slot 25 in the frame matches up with a correspondingly sized slot 23 in the base to permit free access of the bees into the closed region A of the frame from the outside. Similarly the base is provided with a pair of spaced holes 37 and 39 which match up with the spaced holes 27 in the open portion of the frame 19 to provide for free access through the walls of the frame and base. One hole 39 in the base is provided with a tube 41 which extends outwardly from the side of the base and ensures a one-way exit path from the hive while the other hole 37 in the base is provided with a removable stopper (not shown). The holes 37 and 39 in the base are sized such as to permit the access of drones to and from the hive together with the worker bees.

The side of the frame 19 opposite that with the slot 23 and holes 27 and 29 is provided with a second slot 43 in the region of the imperforate portion 33a of the floor whereby the frame 19 may be reversed such that the second slot matches up with the slot 23 in the base to permit free access into and out of the hive without the bees having to pass through the closed space A in the frame.

The perforations in the perforate metal screen 21 are sized to enable the worker bees only to crawl through the screen in that when so doing any pollen on their bodies is dislodged and caused it to pass through the perforate portion 33b of the floor and into the liner 17.

The imperforate sheet 35 above the perforate portion 33b of the floor collects any litter which may drop from the hive and prevent it from contaminating the pollen collected in the liner 17. In addition, the arrangement of the components in the frame in relation to the entrance does not detract from the air flow into the hive thus permitting ready ventilation of the hive for the cooling and living requirements of the hive.

The removable stopper provided in the other hole 37 of the pair of holes in the frame is used to control the ratio of collected pollen to that carried into the hive. The other hole 37, because of its nature would act as both an entrance and exit from the hive. However after a period of time the bees learn that the other hole 37 provides an easier access into the hive than via the enclosed space A and slot 23 and 25 and thus the hole is more heavily used resulting more pollen being carried into the hive and less being collected. When such an instance occurs it is necessary to close the other hold 37. By controlling the entrance into the hive by the hole 37 it is possible to control the amount of pollen carried into the hive which must vary due to a variation in seasonal demand within the hive. In addition by this means the pollen supply to the hive and the pollen collection rate can be varied without changing the grid.

The exterior of the base on the same side as the entrance slot 23 and the holes 37 is provided with a spacer block 45 to prevent blockage of the slot 23 and holes 37 when the hives are stacked. The spacer block 45 is located below the slot 23 and the holes 37 and 39 can serve in a flight board for the incoming and outgoing bees.

As a result of the embodiment it is possible to remove the pollen collection liner and it is possible to reverse the grid to an operative or inoperative position without disturbing the hive. A feature of the embodiment resides in the provision of a means to feed the hive during adverse seasonal conditions by removal of the grid to provide direct access between the hive and the liner 17. Further more if it is desired to prevent the departure of the queen bee from the hive such can be achieved by blocking the apertures 37 and 39 in the base. Since the pollen collection liner and grid are fully contained within the base which snugly engages with the underneath of the hive body there is greater protection from elements offered to the collected pollen. Additional protection from the elements is facilitated by providing the seating frame 31 between the base and hive body.

It should be appreciated that the scope of the invention need not be restricted to the particular scope of the invention.

I claim:

1. A pollen collecting entrance structure for a beehive comprising a base for supporting a beehive, said base defining a space located below the beehive and in open communication therewith through the bottom of said beehive, a pollen collecting receptacle slidably supported in the bottom of said space and removable transversely from said base, an accessway through a wall of said base providing access for bees from the exterior of said base to the area above said receptacle, and pollen-extractint means slidably supported in said base and removable transversely therefrom, said pollen-extracting means comprising means defining an area in communication with said accessway whereby bees may enter said area through said accessway, a vertically extending perforate member providing communication between said area and the portion of said space in communication with the open bottom of the beehive and a floor extending horizontally and located between said pollen-collecting receptacle and the bottom of the beehive, said floor having a grid extending beneath said perforate member and above said pollen-collecting receptacle for permitting pollen to fall into said pollen-collecting receptacle.

2. A pollen collecting entrance structure as claimed at claim 1 wherein the base has a plan corresponding to that of the beehive and the beehive is supported around its lower perimeter by the upper perimeter of the base via a supporting frame formed of angle material, wherein one flange of the angle extends upwardly to engage the lower portion of the interior face of the side walls of the beehive and the other flange extends outwardly beyond the exterior of the side walls of the base and beehive.

3. An entrance structure as claimed at claim 1 wherein the area is defined in part by an imperforate sheet located above and parallel to said floor to cover the portion of the floor adjacent the accessway, the portion of the floor not being under the imperforate sheet being imperforate.

4. An entrance structure as claimed at claim 3 wherein the portion of the floor located under the imperforate sheet is perforated and said receptacle is located directly below the perforated portion of the floor.

5. An entrance structure as claimed at claim 3 wherein the accessway provides the entrance into the beehive for the worker bees only and the portion of the space outside of the area is provided with an exit and restricted entrance for all the bees of the hive.

6. An entrance structure as claimed at claim 5 wherein the restricted entrance is capable of being closed.

7. A pollen-collecting entrance as set forth in claim 1 wherein the pollen extracting means comprises a frame having its internal dimensions corresponding substantially to the internal transverse dimensions of said base, the floor extending across said frame and the vertically extending perforate member extending across said frame in generally a perpendicular relationship to said floor.

8. An entrance structure as set forth in claim 7 wherein the frame when in position in the base covers a slot in the base serving as the accessway therein, said frame being formed with a slot to match up with the slot in the base to provide the accessway through the base and frame.

9. An entrance structure as claimed at claim 8 wherein the frame is provided with a second slot diametrically opposed to the first slot.

10. An entrance structure as claimed at claim 9 wherein the accessway provides an entrance into the beehive of the worker bees only and the portion of the space external to said area is provided with an exit and restricted extrance for all of the bees of the hive.

11. An entrance structure as claimed at claim 10 wherein the exit and restricted entrance are formed in the base and frame by at least one matching apertures in each.

12. An entrance structure as claimed at claim 11 wherein said exit is provided by a separate said of apertures from said restricted entrance which is capable of being closed.

13. An entrance structure as claimed at claim 1 wherein the receptacle is formed by a drawer slidably mounted in the base.

14. An entrance structure as claimed at claim 13 wherein the receptacle has a perforate pollen collecting base supported above the drawer floor.

15. A pollen-collecting entrance structure for a beehive comprising a base for supporting a beehive, said base defining a space located below the beehive and in open communication therewith through the bottom of said beehive, a pollen collecting drawer slidably supported in the bottom of said space and removable transversely from said base, an accessway through a wall of said base providing access for bees from the exterior of said base to the area above said pollen-collecting drawer, and a pollen extracting drawer slidably supported in said base and removable transversely therefrom, said pollen-extracting drawer comprising means defining an area in communication with said accessway whereby bees may enter said area through said accessway, a perforate member providing communication between said area and the portion of said space in communication with the open bottom of the beehive through which at least a portion of the bees entering the open bottom of the beehive must pass, the openings in said perforate member being sized so that pollen is extracted from the bees passing therethrough, and a floor extending horizontally and located between said pollen-collecting receptacle and the bottom of the beehive, said floor having a grid extending beneath said perforate member and above said pollen-collecting receptacle for permitting pollen extracted by the passage of bees through said perforate member to fall into said pollen-collecting receptacle.

16. A pollen collecting entrance structure as claim in claim 15 wherein the base has a plan corresponding to that of the beehive and the beehive is supported around its lower perimeter by the upper perimeter of of the base via a supporting frame formed of angle material, wherein one flange of the angle extends upwardly to engage the lower portion of the interior face of the side walls of the beehive and the other flange extends outwardly beyond the exterior of the side walls of the base and beehive.

17. A pollen collecting entrance structure as claimed in claim 15 wherein the openings of the perforate member are sized so as to permit access to the space therethrough for worker bees only and passage means providing restricted communication of all bees to said space independent of said perforate member.

18. A pollen collecting entrance structure as claimed in claim 17 further including means for selectively closing the passage means.

19. A pollen collecting entrance structure as claimed in claim 19 wherein removal of the pollen-extracting drawer permits free access of bees to the beehive through the access.

20. A pollen collecting entrance structure as claimed in claim 15 wherein at least one of the drawers may be repositioned from its pollen-collecting position as set forth in claim 19 to provide free access to the space below the beehive through the accessway without requiring passage of the bees through the perforate member.

21. A pollen collecting entrance structure as claimed in claim 20 wherein the repositioned drawer provides an unrestricted passage between the accessway and the space.

22. A pollen collecting entrance structure as claimed in claim 21 wherein the repositioned drawer is oriented relative to the base from its pollen-collecting position when it provides the unrestricted access.

* * * * *

UNITED STATES PATENT AND TRADEMARK OFFICE
CERTIFICATE OF CORRECTION

PATENT NO. : 4,322,861
DATED : April 6, 1982
INVENTOR(S) : Kenneth T. Healy

It is certified that error appears in the above—identified patent and that said Letters Patent is hereby corrected as shown below:

Column 2, line 57, "hold" should be --hole--; Column 4, line 34, claim 15, "said" (second occurence) should be --set--; Column 5, line 3, claim 16, "claim" (first occurence) should be --claimed--; Column 6, line 5, claim 19, "19" should be --15--; Column 6, line 11, claim 20, "19" should be --15--.

Signed and Sealed this

Twentieth Day of July 1982

[SEAL]

*Attest:*

*Attesting Officer*

GERALD J. MOSSINGHOFF

*Commissioner of Patents and Trademarks*